(12) United States Patent (10) Patent No.: US 7,729,309 B2
Yoshida et al. (45) Date of Patent: Jun. 1, 2010

(54) AREA MANAGEMENT SYSTEM

(75) Inventors: Akihiko Yoshida, Yokohama (JP); Shiro Mazawa, Fujisawa (JP); Yosuke Takahashi, Yokohama (JP); Daigo Takayanagi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 902 days.

(21) Appl. No.: 11/546,330

(22) Filed: Oct. 12, 2006

(65) Prior Publication Data

US 2007/0211665 A1 Sep. 13, 2007

(30) Foreign Application Priority Data

Mar. 7, 2006 (JP) ............................. 2006-060667

(51) Int. Cl.
*H04W 4/00* (2009.01)
(52) U.S. Cl. ...................... 370/329; 455/450; 455/464
(58) Field of Classification Search ........................ None
See application file for complete search history.

(56) References Cited

U.S. PATENT DOCUMENTS

2007/0259667 A1* 11/2007 Kim et al. .................... 455/440
2008/0287130 A1* 11/2008 Laroia et al. ................. 455/436

OTHER PUBLICATIONS

"CDMA High Rate Broadcast-Multicast Packet Data Air Interface Specification" 3$^{rd}$ Generation Partnership Project 2 "3GPP2". Feb. 2004.

* cited by examiner

*Primary Examiner*—Rafael Pérez-Gutiérrez
*Assistant Examiner*—Marcos Batista
(74) *Attorney, Agent, or Firm*—Brundidge & Stanger, P.C.

(57) ABSTRACT

A transmission area is specified flexibly in accordance with the contents of a flow. An area identification number (SHOG) is specified for each interlaced stream of wireless base stations. The same flow is sent at the same timing (or substantially at the same timing) in the interlaced stream specified for the same SHOG. A wireless terminal determines a neighbor sector or a neighbor wireless base station sending the same flow, in accordance with information given from the wireless base stations, and receives and combines the flows.

18 Claims, 13 Drawing Sheets

SHOG MANAGEMENT TABLE 240

| Interlace | SHOG |
|---|---|
| 0 | 1 |
| 1 | 1 |
| 2 | 2 |
| 3 | 3 |

BELONGING TO THREE AREAS

Interlace0  
Interlace1  } SPECIFIED AS SHOG 1 (AREA 1)

Interlace2 } SPECIFIED AS SHOG 2 (AREA 2)

Interlace3 } SPECIFIED AS SHOG 3 (AREA 3)

FIG.6

FLOW INFORMATION MANAGEMENT TABLE 241

| FLOW ID | INTERLACE NUMBER | TRANSMISSION TIMING | TRANSMISSION TIME | TRANSMISSION DATA RATE |
|---|---|---|---|---|
| 0x01 | 0 | FROM 1ST SLOT | 64 slots | 153.6 kbps |
| 0x02 | 0 | FROM 65TH SLOT | 128 slots | 204.8 kbps |
|  | 1 | FROM 1ST SLOT | 64 slots | 204.8 kbps |
| 0x04 | 2 | FROM 1ST SLOT | 48 slots | 76.8 kbps |
| 0x08 | 3 | FROM 1ST SLOT | 48 slots | 153.6 kbps |

Interlace0: FLOW 0x01 | FLOW 0x02
Interlace1: FLOW 0x02
Interlace2: FLOW 0x04
Interlace3: FLOW 0x08

FIG.7

FLOW MANAGEMENT TABLE

| FLOW ID | SHOG | INTERLACE NUMBER | TRANSMISSION TIME | TRANSMISSION DATA RATE |
|---|---|---|---|---|
| 0x01 | 1 | 0 or 1 | 64 slots | 153.6 kbps |
| 0x02 | 1 | 0 or 1 | 192 slots | 204.8 kbps |
| ... | | ... | ... | ... |
| 0x04 | 2 | 2 | 48 slots | 76.8 kbps |
| ... | | ... | ... | ... |
| 0x08 | 3 | 3 | 48 slots | 153.6 kbps |
| ... | | ... | ... | ... |

FIG.8

RESOURCE MANAGEMENT TABLE 302

| SHOG | FLOW ID | INTERLACE NUMBER | TRANSMISSION TIMING | TRANSMISSION TIME |
|---|---|---|---|---|
| 1 | 0x01 | 0 | FROM 1ST SHOT | 64 slots |
|  | 0x02 | 0 | FROM 65TH SHOT | 128 slots |
|  |  | 1 | FROM 1ST SHOT | 64 slots |
| 2 | 0x04 | 2 | FROM 1ST SHOT | 48 slots |
| 3 | 0x08 | 3 | FROM 1ST SHOT | 48 slots |

FIG.9

BASIC MESSAGE FORMAT
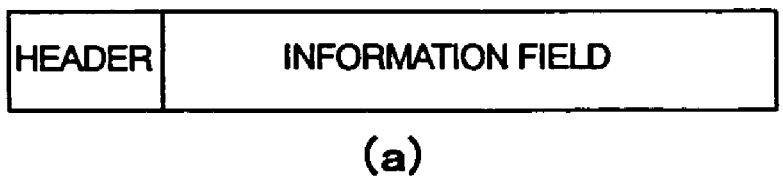
(a)
Service Request MESSAGE
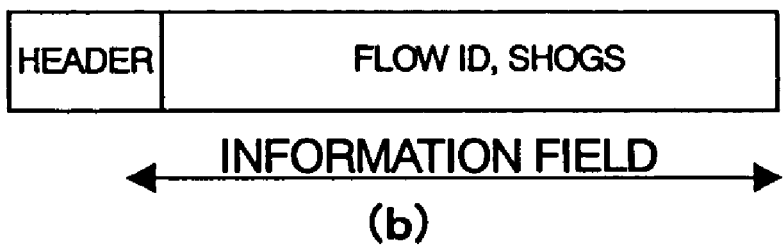
(b)
Service Response MESSAGE
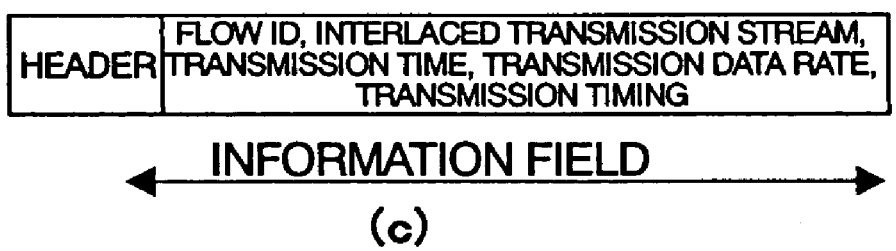
(c)
FIG.11

SAMPLE FORMAT OF INFORMATION FIELD IN Service Request MESSAGE

| FIELD NAME | VALUE (EXAMPLE) | DESCRIPTION |
|---|---|---|
| FlowIDCount | 1 | NUMBER OF IDS OF FLOWS WHICH ARE REQUESTED TO SEND |
| RequestFlowID[0] | 0x01 | ID(S) OF FLOW(S) WHICH IS/ARE REQUESTED TO SEND |
| PAD | 0 | Padding |
| Interlace0SHOG | 1 | SHOG NUMBER OF INTERLACE 0 |
| Interlace1SHOG | 1 | SHOG NUMBER OF INTERLACE 1 |
| Interlace2SHOG | 2 | SHOG NUMBER OF INTERLACE 2 |
| Interlace3SHOG | 3 | SHOG NUMBER OF INTERLACE 3 |
| Reserve | 0 | Reserve |

(a)

SAMPLE FORMAT OF INFORMATION FIELD IN Service Response MESSAGE

| FIELD NAME | VALUE (EXAMPLE) | DESCRIPTION |
|---|---|---|
| FlowIDCount | 1 | NUMBER OF IDS OF FLOWS WHICH ARE REQUESTED TO SEND |
| RequestFlowID[0] | 0x01 | ID(S) OF FLOW(S) WHICH IS/ARE REQUESTED TO SEND |
| PAD | 0 | Padding |
| UseInterlaceCount | 1 | NUMBER OF INTERLACED STREAMS USED |
| FOLLOWING FOUR FIELDS ARE REPEATED AS MANY TIMES AS USER INTERLACE COUNT | | |
| UseInterlace[0] | 1 | SHOG VALUE OF INTERLACE 0 |
| SendingTime[0] | 64 | FLOW TRANSMISSION TIME |
| Datarate[0] | 153.6 | FLOW TRANSMISSION DATA RATE |
| SendStartTiming | 1 | TRANSMISSION TIMING |
| Reserve | 0 | Reserve |

AREA MANAGEMENT SYSTEM

BACKGROUND OF THE INVENTION

1. Field of the Invention

The present invention relates to area management systems, and more specifically, to an area management system for a multicast service for allowing a plurality of wireless terminals to receive a flow transmitted from a wireless base station, in a wireless system for conducting voice or data communication, with control information sent from the wireless base station.

2. Description of the Related Art

With the proliferation of broadband, technological advances of routers and other apparatuses, the growing need of end users for receiving broadband streaming pictures and the like, and advances in producer-driven solutions, the multicast technology, which can broadcast data with a fewer communication resources than the unicast technology, has been attracting growing interest in the communication field. With the multicast technology, a router placed between a server and clients makes a required number of duplicates of one packet or one data stream and delivers the duplicates to a plurality of users simultaneously. In comparison with the unicast method, in which data is exchanged with a plurality of parties in a one-to-one relationship, the multicast technology can reduce the traffic volume on the network and can reduce the load on the server that delivers data.

In the wireless communication field, a communication technology for allowing a plurality of wireless terminals to receive one data stream has been studied to increase the efficiency of the wireless band and network. The conventional wireless communication system uses one-to-one unicast communication, in which a physical channel is assigned to each wireless terminal, and a wireless connection is established for communication. In one communication technology under study, one certain channel of the physical channels is specified as a multicast channel, and data having a multicast IP address is sent therethrough. This technology enables a plurality of wireless terminals to receive one data stream, and the wireless band can be used efficiently.

Generally, a wireless base station has one or more sectors. It is conceivable that the radio reception of a wireless terminal depends on the radio propagation environment in a sector where the wireless terminal is located. In unicast communication, in which one-to-one communication is conducted between the wireless terminal and the wireless base station, the data rate can be controlled in accordance with the radio environment of the wireless terminal, such as increasing the data rate of the transmission data when the radio reception (propagation state) of the wireless terminal is good and decreasing the data rate when the radio reception (propagation state) is bad. In multicast communication, however, data transmitted at a certain data rate on the multicast channel must be received, and some wireless terminals may not be able to receive the multicast data when the radio environment is too poor to receive the data at the data rate. Whether the data received by a wireless terminal can be decoded or not generally depends on the ratio of the magnitude of the received actual data to the magnitude of interference noise, for instance. The ratio of the magnitude of the actual data signal to the magnitude of the interference noise must be increased so that more wireless terminals can receive the multicast data at a certain data rate.

If a wireless terminal communication technology Code Division Multiple Access (CDMA) is used, for instance, the conventional unicast communication technology selects a sector of the best radio environment for communication, and all the radio waves sent from the other neighbor sectors become interference noise. In multicast communication, the same data is sent at the same timing (or substantially at the same timing) in a plurality of neighbor sectors by using the same frequency, and the wireless terminal receives and combines the data signals, so that the ratio of the intensity of the actual data to the intensity of interference noise can be increased. This technology is named soft-combine and is described in 3rd generation partnership project 2 (3GGP2) C.S0054, for instance.

With the method of sending the same data at the same timing in neighbor sectors and receiving and combining, by wireless terminals, the signals sent at the sectors, the ratio of actual data to interference noise increases, and more wireless terminals can receive multicast data, in comparison with the method of selecting a sector in a good radio environment for communication. The wireless base station incorporates a data transmission timing in control information and broadcasts the information to wireless terminals at regular intervals.

SUMMARY OF THE INVENTION

A wireless network generally includes a wireless base station, a communication control apparatus, and the like. The wireless base station has one or more sectors and conducts wireless communication with a wireless terminal in each sector. The communication control apparatus is connected to the wireless base station by wire, and configures a wireless protocol, manages session information, controls wireless packets, termination, and the like. The communication control apparatus is connected to one or more wireless base stations.

Multicast voice or data sent from the wireless base station to a wireless terminal are referred to as a flow. The flow is continuously sent from the wireless base station to the wireless terminal at regular intervals and at a constant data rate. The wireless base station broadcasts the information of the flow transmission intervals and data rate to the wireless terminal at regular intervals. The transmission area of the multicast flow may depend on the contents of the flow. For instance, a flow of a national weather report and the like must be delivered to a large area, but a flow of guide information of an amusement park does not have to be sent in a large area and should be delivered in a limited area such as the site of the amusement park. Sending the flow to an unnecessary area wastes the wireless band of the area, so that the delivery area must be managed in accordance with the contents of the low, and the flow delivery must be controlled accordingly. In an area management system, which is being developed for a commercial service, there is a one-to-one correspondence between the wireless base station and the delivery area, and the size of the delivery area cannot be adjusted in accordance with the contents of the flow to be transmitted.

To implement the soft-combine technology described above, the same flow must be sent at the same timing in a plurality of sectors. For instance, if the communication control apparatus, which is on a higher level than the wireless base stations, manages the wireless resources in all the sectors of wireless base stations and notifies the wireless base stations of the time to send the same flow, the flow transmission timing can be synchronized among all the sectors of the different wireless base stations. This method of synchronizing all the sectors of the wireless base stations by the communication control apparatus, however, causes a problem. When a wireless base station assigns a flow to a sector, the same flow may be sent at another sector in the same time zone, so that the time zone of the flow transmission must be saved even if the flow is not sent. Another multicast flow cannot be assigned to the saved time zone, reducing the number of flows that can be sent in the entire system. One method of increasing the number of flows that can be sent in the entire system is to divide a single area into a plurality of sub-areas and to manage flow transmission in each sub-area. This method, however, divides transmission timing control into sub-areas. If a flow which must be sent in several sub-areas is sent to a wireless terminal, soft-combine is impossible in the sub-areas, and the wireless reception quality is degraded on the boundary of the sub-areas.

Accordingly, it is an object of the present invention to use the wireless band efficiently by eliminating uselessly saved time resources through assigning one sector to a plurality of areas and specifying a transmission area flexibly in accordance with the contents of the flow. Another object of the present invention is to improve the reception quality of the wireless terminals across the system by preventing a single flow from being transmitted in a plurality of areas and enabling data to be soft-combined among sectors in a variety of large and small areas. A further object of the present invention is to increase the number of flows that can be sent in the entire system by managing wireless resources on the area basis to allow a different flow to be sent in a time resource which is used to be saved fundamentally.

According to the first solving means, there is provided an area management system comprising:

a plurality of wireless base stations which have one or more sectors;

a communication control apparatus connected to the plurality of wireless base stations, for controlling flows of a multicast content; and a wireless apparatus for combining flows transmitted from plural wireless base stations and restoring the content, wherein each of the plurality of wireless base stations comprises:

an area information management table having stored an area identification number indicating a flow transmission area for each interlace number used in flow transmission; and a flow information management table having stored an interlace number, a transmission timing for periodically transmitting a flow periodically in an interlaced stream, a flow transmission time in one cycle, and a transmission data rate in flow transmission, for each flow ID obtained from the communication control apparatus;

the communication control apparatus comprises:

a flow management table having stored an area identification number, an interlace number, a transmission time, and a transmission data rate, for each flow ID; and a resource management table having stored a flow ID, an interlace number, a transmission timing, and a flow transmission time, for each area identification number; and, the wireless apparatus sends a first flow delivery request to one of the plurality of wireless base stations, with the flow ID of a content-delivery flow specified;

when the wireless base station receives the first flow delivery request from the wireless apparatus, the wireless base station references the area information management table, reads the area identification number specified for each local interlace number, which is required when a service request is sent to the communication control apparatus, and sends a first request message containing the flow ID specified in the first flow delivery request and the read area identification number of each local interlace number, to the communication control apparatus;

when the communication control apparatus receives the first request message from the wireless base station, the communication control apparatus references the flow management table and reads the corresponding area identification number, interlace number, transmission time, and transmission data rate in accordance with the first request message;

the communication control apparatus references the resource management table in accordance with the flow ID and the read area identification number, interlace number, and transmission time, determines a flow transmission timing by provisionally assigning a requested flow resource to a free resource of the corresponding area identification number and stores the transmission timing in association with the area identification number, the flow ID, the interlace number, and the transmission time in the resource management table if the corresponding flow transmission timing is not specified, or reads the transmission timing from the resource management table if the corresponding flow transmission timing is specified;

the communication control apparatus returns a first response message containing the flow ID included in the received first request message, the interlace number of the interlaced stream to deliver the flow, the transmission time, the transmission data rate, and the transmission timing, to the wireless base station;

when the wireless base station receives the first response message, the wireless base station stores the flow ID and flow information received from the communication control apparatus, containing the interlace number, the transmission time, the transmission data rate, and the transmission timing, in the flow information management table, establishes a path to pass the flow to or from the communication control apparatus, in accordance with the flow information, and sends the flow by radio in accordance with the flow information;

while the wireless base station is sending the flow, if a neighbor wireless base station receives a second flow delivery request having the same flow ID from the same wireless apparatus, the neighbor wireless base station references the local area information management table, reads the area identification number specified for each interlace number, and sends a second request message to the communication control apparatus;

the communication control apparatus references the flow management table, reads the area identification number, the interlace number, the transmission time, and the transmission data rate, corresponding to the flow ID, and returns a second response message containing the same flow information as the first response message to the neighbor wireless base station;

when the neighbor wireless base station receives the second response message from the communication control apparatus, the neighbor wireless base station stores the same flow information as in the first response message in the local flow information management table for a sector where the wireless apparatus is located, establishes a path to pass the flow to or from the communication control apparatus in accordance with the flow information, and sends the flow by radio in the corresponding sector in accordance with the flow information such that the same content is sent from the neighbor wireless base station and the wireless base station substantially at the same timing; and the wireless apparatus receives and combines the flow from the wireless base station and the flow from the neighbor wireless base station.

According to the second solving means, there is provided an area management system comprising:

a wireless base station having a plurality of sectors;

a communication control apparatus connected to the wireless base station, for controlling flows of a multicast content; and a wireless apparatus for combining flows sent at plural sectors of the wireless base station and restoring the content, wherein the wireless base station comprises:

an area information management table having stored an area identification number indicating a flow transmission area for each interlace number used in flow transmission, in association with each sector; and a flow information management table having stored an interlace number, a transmission timing for transmitting a flow periodically in an interlaced stream, a flow transmission time in one cycle, and a transmission data rate in flow transmission, for each flow ID obtained from the communication control apparatus, in association with each sector;

the communication control apparatus comprises:

a flow management table having stored an area identification number, an interlace number, a transmission time, and a transmission data rate, for each flow ID; and a resource management table having stored a flow ID, an interlace number, a transmission timing, and a flow transmission time, for each area identification number; and, the wireless apparatus sends a first flow delivery request to the wireless base station, with a flow ID of a content-delivery flow in a first sector specified;

when the wireless base station receives the first flow delivery request from the wireless apparatus, the wireless base station references the area information management table for a sector where the wireless apparatus is located, reads the area identification number specified for each local interface number, which is required when a service request is sent to the communication control apparatus, and sends a first request message containing the flow ID specified in the first flow delivery request and the read area identification number for each local interlace number, to the communication control apparatus;

when the communication control apparatus receives the first request message from the wireless base station, the communication control apparatus references the flow management table and reads the corresponding area identification number, interlace number, transmission time, and transmission data rate, in accordance with the first request message;

the communication control apparatus references the resource management table in accordance with the flow ID and the read area identification number, interlace number, and transmission time, determines a flow transmission timing by provisionally assigning a requested flow resource to a free resource of the corresponding area identification number and stores the transmission timing in association with the area identification number, the flow ID, the interlace number, and the transmission time in the resource management table if the corresponding flow transmission timing is not specified, or reads the transmission timing from the resource management table if the corresponding flow transmission timing is specified;

the communication control apparatus returns a first response message containing the flow ID included in the received first request message, the interlace number of the interlaced stream to deliver the flow, the transmission time, the transmission data rate, and the transmission timing, to the wireless base station;

when the wireless base station receives the first response message, the wireless base station stores the flow ID and flow information received from the communication control apparatus, containing the interlace number, the transmission time, the transmission data rate, and the transmission timing, in the flow information management table, in association with a sector where the wireless apparatus is located, establishes a path to pass the flow to or from the communication control apparatus, in accordance with the flow information, and sends the flow by radio in the sector in accordance with the flow information;

while the wireless base station is sending the flow in the first sector, when a second flow delivery request having the same flow ID is received from the same wireless apparatus in a second sector of the wireless base station, the wireless base station references the area information management table, reads the area identification number specified for each interlace number for the second sector, and sends a second request message to the communication control apparatus;

the communication control apparatus references the flow management table, reads the area identification number, the interlace number, the transmission time, and the transmission data rate, associated with to the corresponding flow ID, and returns a second response message containing the same flow information as the first response message to the second sector of the wireless base station;

when the wireless base station receives the second response message from the communication control apparatus, the wireless base station stores the same flow information as in the first response message in the flow information management table for the second sector, establishes a path to pass the flow to or from the communication control apparatus in accordance with the flow information, and sends the flow by radio in the second sector in accordance with the flow information such that the same content is sent at the first sector of the wireless base station and the second sector of the wireless base station substantially at the same timing; and the wireless apparatus receives and combines the flow at the first sector of the wireless base station and the flow at the second sector of the wireless base station.

According to the present invention, one sector belongs to a plurality of areas, and a flow transmission area can be specified flexibly in accordance with the contents of the flow. Because time resources will not be saved uselessly, the wireless band can be used efficiently. The present invention prevents a single flow from being transmitted in several areas and enables data to be soft-combined among sectors in a variety of large and small areas, so that the reception quality of the wireless terminals can be improved in the entire system. The wireless resource management on the area basis according to the present invention allows a different flow to be sent in a time resource which is used to be saved fundamentally, so that the number of flows that can be sent in the entire system can be increased.

BRIEF DESCRIPTION OF THE DRAWINGS

FIG. 6 is a view illustrating a SHOG management table 240.

FIG. 7 is a view illustrating a flow information management table 241.

FIG. 8 is a view illustrating a flow management table 301.

FIG. 9 is a view illustrating a resource management table 302.

FIG. 11 is a view illustrating message formats used in the embodiment.

FIG. 12 is a view illustrating detailed formats of the information fields of messages.

DESCRIPTION OF THE PREFERRED EMBODIMENTS

1. Overview

Figure 1:
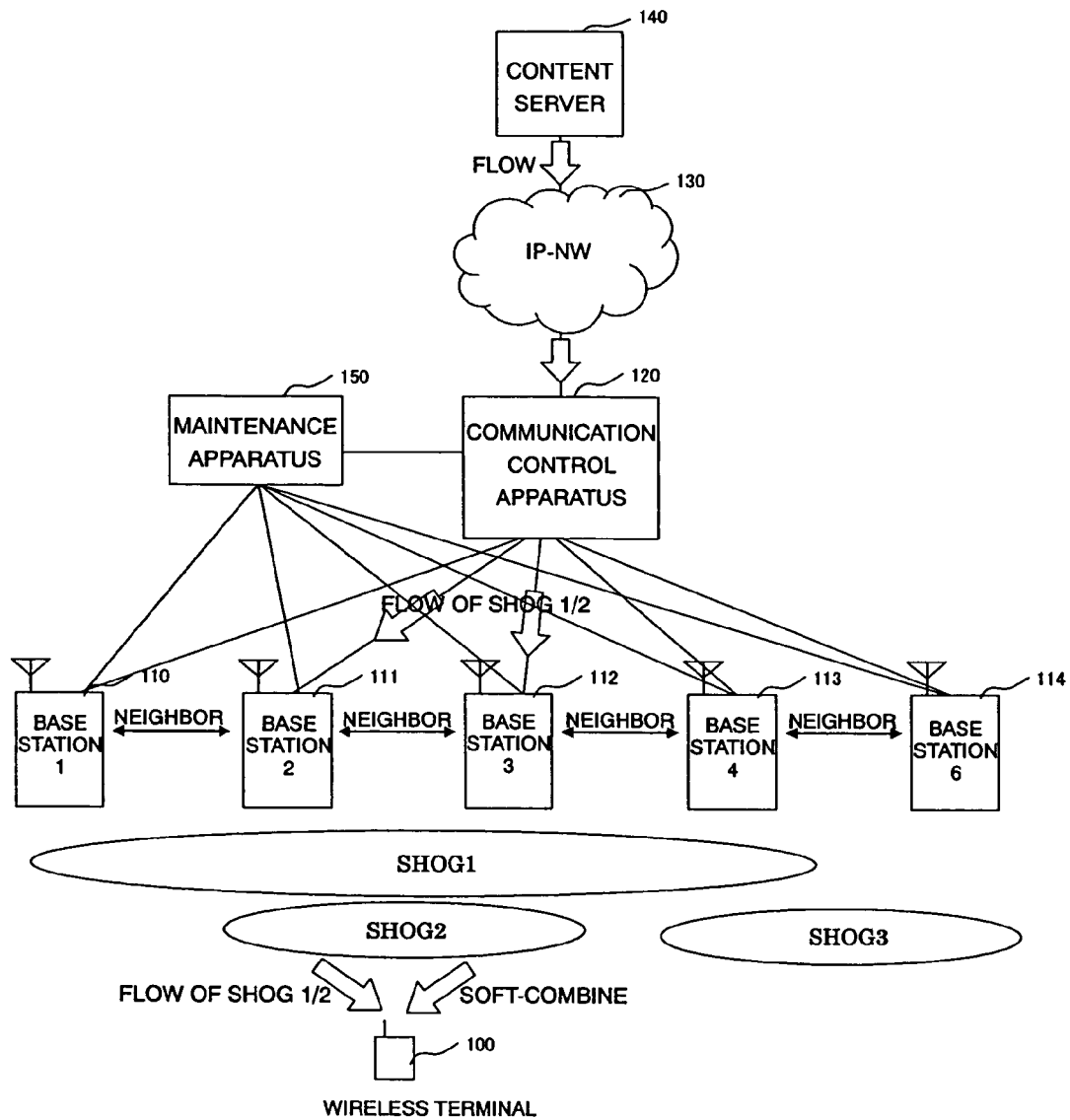
FIG. 1 is a diagram showing the configuration of a wireless system.

A 1x evolution data only (1xEV-DO) system uses time division multiplexing in downstream (from the wireless base station to the terminal) communication, and the time unit of multiplexed transmission is a slot (one slot is about 1.67 milliseconds, for instance). In the conventional unicast communication, the wireless terminal receives data from the wireless base station and returns a response indicating whether the data was able to be normally decoded, to the wireless base station. The wireless base station schedules re-transmission of the same data or transmission of next data in accordance with the response from the wireless terminal. It generally takes three slots to send data from the wireless base station to the wireless terminal and to schedule the data to be sent next after the response is received from the wireless terminal. The wireless base station sends data to a certain wireless terminal once every four slots, taking the period of three slots into consideration. A standard name for a combination of four-slot transmission operations is interlacing. The interval is not limited to four slots and can be set to any number of slots. In a multicast service, the soft-combine technology is implemented by sending flows at regular intervals from the wireless base station and receiving the flows by a plurality of wireless terminals, as described above. In embodiments described below, a problem of the multicast service is solved by associating four interlaced transmission streams with a flow transmission area.

Further details will be given below. A wireless base station has one or more sectors. Each interlaced stream in each sector is given a desired area identification number. The area identification number is referred to as a soft handoff group (SHOG). To make a plurality of wireless base stations share common information of a correspondence between SHOG and a flow, the information is managed by a communication control apparatus, which is connected to one or more wireless base stations by wire and can manage the information of the plurality of wireless base stations. The communication control apparatus also manages the wireless data rate at which the flow is sent by radio, the time of successive transmission of the flow in one cycle, and other information. When a flow delivery request is received from a wireless terminal or a maintenance apparatus in a local sector, the wireless base station inquires of the communication control apparatus the correspondence between the flow ID and SHOG in order to obtain the interlace information for the requested flow transmission. The message of inquiry includes flow ID information for identifying the flow and SHOG number information of the interlaced streams in the sector in which the flow delivery request is received. The communication control apparatus recognizes a flow delivery SHOG from the flow ID information and searches for a resource for sending the newly requested flow through the SHOG time resources of one cycle. If the SHOG time resources have a free resource available to send the requested flow, the flow transmission timing is determined among the time resources of one cycle. The communication control apparatus returns the flow delivery SHOG number, data rate of wireless flow transmission, flow transmission timing in a cycle, flow transmission time in one cycle, and other information in response to the message received from the wireless base station. The wireless base station uses the information received from the communication control apparatus to establish a path to the communication apparatus and delivers the flow.

If a flow is received at a plurality of different sectors, the flow transmission timing in the sectors are synchronized by specifying the same SHOG number to the corresponding interlaced streams in the different sectors, to implement soft-combine. The size of the flow transmission area can be freely controlled in accordance with the contents of the flow by increasing or decreasing the number of sectors specified for the same SHOG number. Each sector has four interlace operations, and each sector can belong to up to four different areas simultaneously if different SHOG numbers are specified to the interlaced streams. When a multicast flow is sent in a small area, this technology prevents the other wireless base stations from saving resources uselessly, so that the wireless band can be used efficiently. Soft-combine can be implemented in a variety of large and small areas, and the reception quality of the wireless terminals in the entire system is improved.

This embodiment is not limited to the management method in which a SHOG number is specified to each interlaced stream. One sector can belong to four or more areas at one time by subdividing each interlaced stream, such as interlace 1-1, interlace 1-2, . . . , and interlace 1-*n* (n is a desired integer), and managing the resources with a SHOG number specified to each subdivided interlaced stream.

2. System

FIG. 1 is a diagram showing the configuration of a wireless system.

The wireless system includes a wireless terminal 100, wireless base stations 110, 111, 112, 113, and 114, a communication control apparatus 120, a content server 140, and a maintenance apparatus 150. The wireless base stations 110, 111, 112, 113, and 114 are disposed in such positions that the radio waves transmitted by the wireless base stations are adjoined and the wireless terminal 100 can receive the radio waves of the wireless base stations, so that soft-combine can be implemented. The wireless base station 110 and wireless base station 111 are adjoined, the wireless base station 111 and the wireless base station 112 are adjoined, the wireless base station 112 and the wireless base station 113 are adjoined, and the wireless base station 113 and wireless base station 114 are adjoined. Each interlaced stream in the sectors of the wireless base stations 110, 111, 112, 113, and 114 is assigned an area identification number (SHOG). In interlaced streams having the same SHOG, the same flow is sent at the same timing (or substantially at the same timing).

The wireless base stations 110, 111, 112, 113, and 114 communicate with the wireless terminal 100 by radio. The wireless base stations 110, 111, 112, 113, and 114 send a multicast flow in the multicast channel of each sector. Each multicast flow is assigned an identifier, or a flow ID. The wireless base stations 110, 111, 112, 113, and 114 create control information including the flow ID of the flow being transmitted, transmission time, transmission timing, and wireless data rate of the flow, and gives the control information to the wireless terminal 100 at regular intervals. The wireless terminal 100 receives the flow in accordance with the contents of the given information. If the same flow is sent in a neighbor sector, the wireless base stations 110, 111, 112, 113, and 114 provide the wireless terminal 100 with the information of the neighbor sectors where the same flow is sent, or the information of the sectors having the same SHOG number. The wireless terminal 100 judges the neighbor sector or the neighbor wireless base station that is sending the same flow, from the neighbor sector information and the like given from the wireless base stations 110, 111, 112, 113, and 114, and receives and combines the flows.

The communication control apparatus 120 is a wireless packet control apparatus and has functions to manage the session information of the wireless terminal 100, authenticate a terminal, and control and terminate a wireless packet. The communication control apparatus 120 also manages the numbers of interlaced streams to deliver a multicast flow, SHOG, and wireless flow resource information for sending the same data at the same timing by the wireless base stations 110, 111, 112, 113, and 114, and has a function to send packets to the wireless base stations 110, 111, 112, 113, and 114 in accordance with the wireless resource information.

The content server 140 is connected to an Internet protocol network (IP-NW) 130 by wire and delivers the flow to be broadcast. The content server 140 communicates with the communication control apparatus 120 through the IP-NW and has functions to start or stop flow transmission in response to a request to start or stop flow transmission from the communication control apparatus 120.

The maintenance apparatus 150 is connected to the wireless base stations 110, 111, 112, 113, and 114, and the communication control apparatus 120, and controls and monitors the wireless base stations 110, 111, 112, 113, and 114 and the communication control apparatus 120 for a failure.

Figure 2:
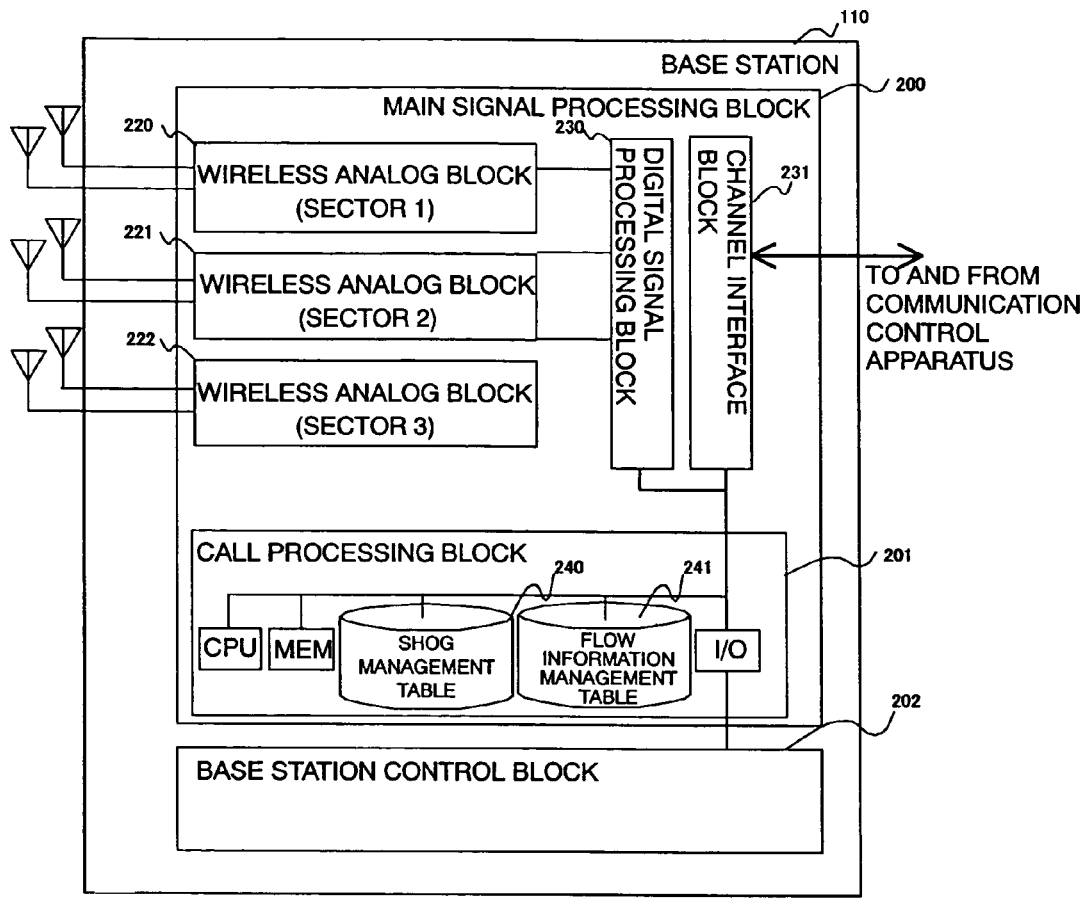
FIG. 2 is a diagram showing the configuration of wireless base stations 110, 111, 112, 113, and 114.

FIG. 2 is a diagram showing the configuration of the wireless base stations 110, 111, 112, 113, and 114.

The wireless base stations 110, 111, 112, 113, and 114 have a main signal processing block 200, a base station control block 202 for controlling the wireless base station and monitoring a failure, and an antenna for each sector. The main signal processing block 200 has a plurality of wireless analog blocks (sectors) 220, 221, and 222, a call processing block 201, a digital signal processing block 230, and a channel interface block 231.

The wireless analog blocks (sectors) 220, 221, and 222 have an antenna, a wireless reception block, and a wireless transmission block, for instance. The wireless analog blocks 220, 221, and 222 send and receive a signal to and from the wireless terminal 100 by radio. The wireless analog blocks 220, 221, and 222 receive an upstream signal sent from the wireless terminal 100, converts the received analog signal to a digital signal, and sends the signal to the digital signal processing block 230, for instance. The wireless analog blocks 220, 221, and 222 also convert a digital downstream signal sent from the digital signal processing block 230 to an analog signal and send the signal to the wireless terminal 100 by radio. The wireless analog blocks 220, 221, and 222 can have a diversity configuration as shown in the figure, for instance. The call processing block 201 includes a SHOG management table 240 for managing SHOG as area information, a flow information management table 241 for managing the flow information, a CPU, a memory (MEM), and an interface (I/O). The call processing block 201 is connected through the digital signal processing block 230 to each wireless analog block and performs call processing mainly.

The channel interface 231 interfaces communication between the cal processing block 201 and the communication control apparatus 120. The digital signal processing block 230 is a unit for demodulating the upstream signal and modulating the downstream signal. The base station control block 202 controls the entire base station and monitors a failure.

Figure 3:
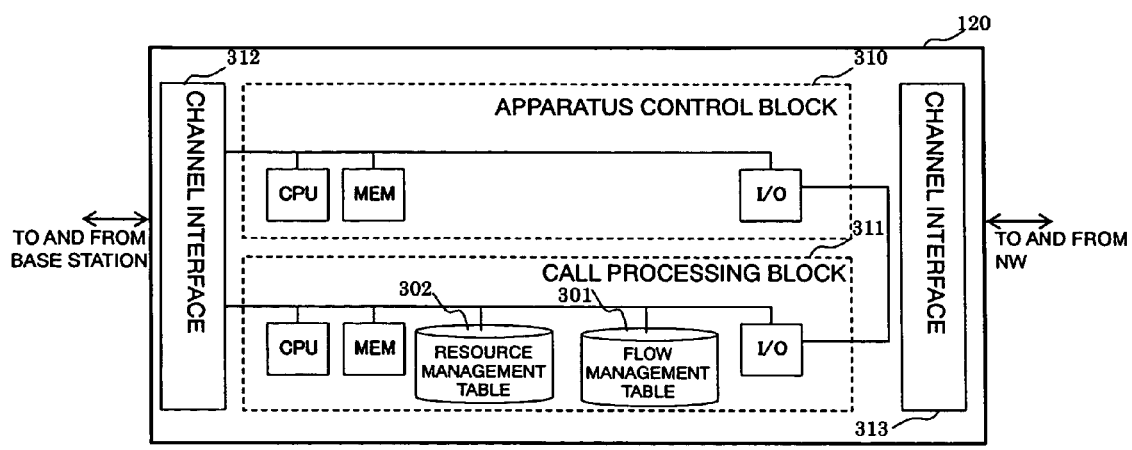
FIG. 3 is a diagram showing the configuration of a communication control apparatus 120.

FIG. 3 is a diagram showing the configuration of the communication control apparatus 120.

The communication control apparatus 120 includes an apparatus control block 310, a call processing block 311, and channel interfaces 312 and 313. The call processing block 311 includes a flow management table 301, a resource management table 302, a CPU, a memory (MEM), and an interface (I/O). The apparatus control block 310 includes a CPU, a memory (MEM), and an interface (I/O).

The call processing block 311 performs call processing with the call processing blocks 201 of the wireless base stations 110, 111, 112, 113, and 114, for instance. The resource management table 302 manages flow ID information, flow transmission time for each SHOG, transmission timing, and the like, which are necessary to implement soft-combine among the wireless base stations controlled by the communication control apparatus 120. The flow management table 301 manages the association among the flow, the interlaced flow transmission stream, and SHOG. The communication control apparatus 120 sends flow information in response to a flow information acquisition request sent from the wireless base stations 110, 111, 112, 113, and 114 and updates the resource management table 302. The apparatus control block 310 controls the whole of the communication control apparatus 120 and monitors a failure.

Figure 4:
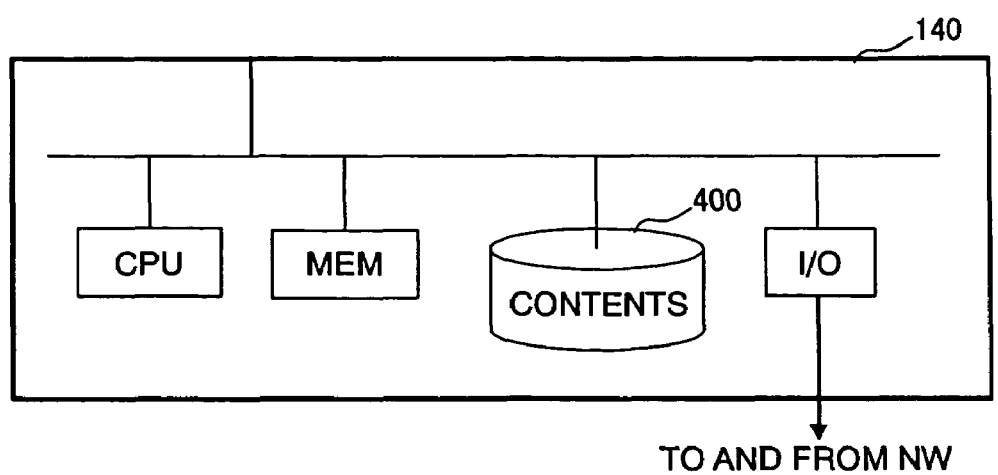
FIG. 4 is a diagram showing the configuration of a content server 140.

FIG. 4 is a diagram showing the configuration of the content server 140.

The content server 140 includes a CPU, a memory (MEM), multicast contents 400, and an interface (I/O) for connecting to the IP-NW. The content server 140 manages the contents and starts or stops content delivery in response to a request to start or stop flow delivery, sent from the communication control apparatus 120.

Figure 5:
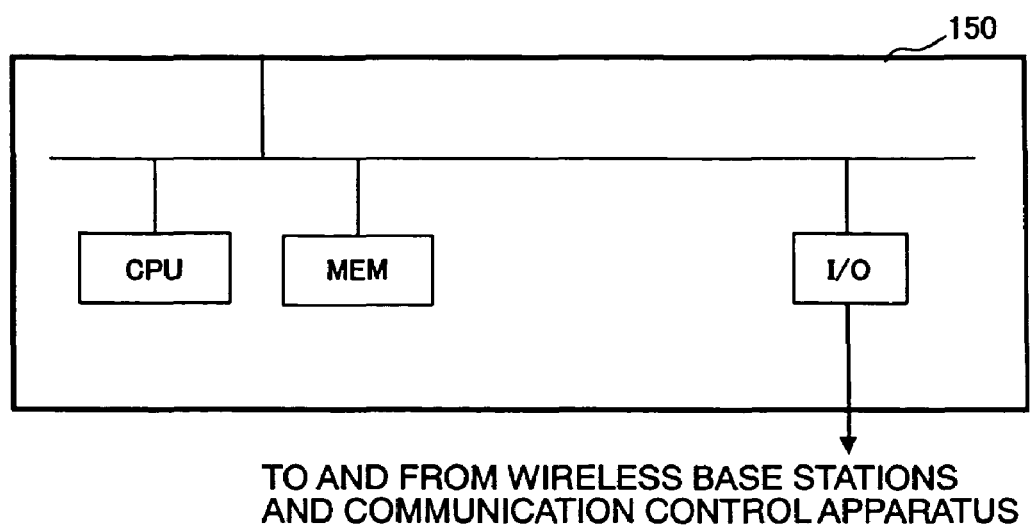
FIG. 5 is a diagram showing the configuration of a maintenance apparatus 150.

FIG. 5 is a diagram showing the configuration of the maintenance apparatus 150.

The maintenance apparatus 150 includes a CPU, a memory (MEM), and an interface (I/O) for connecting to the wireless base stations 110, 111, 112, 113, and 114 and the communication control apparatus 120. The maintenance apparatus 150 is connected to the wireless base stations 110, 111, 112, 113, and 114 and the communication control apparatus 120, and controls the wireless base stations 110, 111, 112, 113, and 114 and the communication control apparatus 120 and monitors a failure. The maintenance apparatus 150 also has a function to send a flow transmission request to the wireless base stations 110, 111, 112, 113, and 114.

FIG. 6 is a view illustrating the SHOG management table 240 included in each of the wireless base stations 110, 111, 112, 113, and 114.

The wireless base stations 110, 111, 112, 113, and 114 manage the area information (SHOG) specified for each interlaced stream in the sector in the SHOG management table 240. In this embodiment, a sector belongs to three areas by specifying Interlace 0 and Interlace 1 to SHOG 1, Interlace 2 to SHOG 2 and Interlace 3 to SHOG 3.

FIG. 7 is a view illustrating the flow information management table 241 included in each of the wireless base stations 110, 111, 112, 113, and 114.

With the flow information management table 241, the wireless base stations 110, 111, 112, 113, and 114 manage the interlaced stream of flow delivery, transmission timing, transmission time, and transmission data rate, in association with each flow ID obtained from the communication control apparatus 120, in each sector. FIG. 7 shows a case in which the wireless base stations 110, 111, 112, 113, and 114 send flows having flow IDs 0x01, 0x02, 0x04, and 0x08 in this embodiment.

FIG. 8 is a view illustrating the flow management table 301 included in the communication control apparatus 120.

With the flow management table 301, the communication control apparatus 120 manages the interlaced flow transmission stream, transmission time, and transmission data rate, in association with each flow ID.

FIG. 9 is a view illustrating the resource management table 302 included in the communication control apparatus 120.

With the resource management table 302, the communication control apparatus 120 manages the wireless resource information for each SHOG. The resource management table 302 manages SHOG, flow ID, interlaced flow delivery stream, flow transmission timing in the interlaced stream, and flow transmission time. FIG. 9 shows a case in which the wireless base stations 110, 111, 112, 113, and 114 controlled by the communication control apparatus 120 send flows having flow IDs 0x01, 0x02, 0x04, and 0x08.

FIG. 11 is a view illustrating message formats.

FIG. 11(a) shows a basic message format; FIG. 11(b) shows a general format of a Service Request message; and FIG. 11(c) shows a general format of a Service Response message. Each message has a header and an information field.

FIG. 12 is a view illustrating detailed formats of the information fields of messages.

FIG. 12(a) shows the information field of the Service Request message. FIG. 12(b) shows the information field of the Service Response message.

3. Operation 1 (Soft-Combine Between Neighbor Wireless Base Stations)

Figure 10:
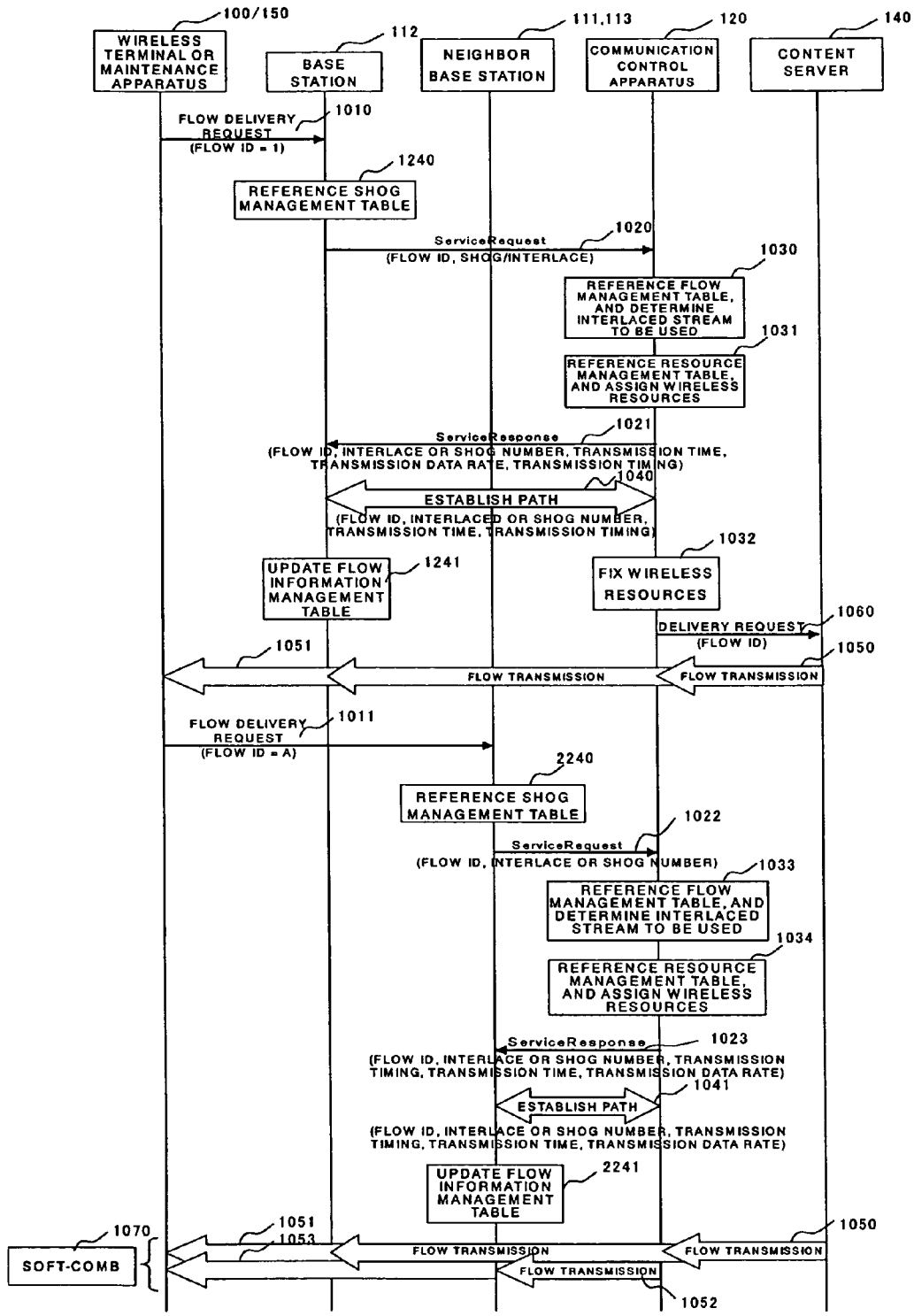
FIG. 10 is a diagram showing a sequence for implementing area management of a first embodiment.

FIG. 10 is a diagram showing a sequence for implementing area management of a first embodiment.

The initial state of the embodiment is as follows: The data of the SHOG management tables 240 in the wireless base stations 112, 111, and 113 is specified as shown in FIG. 6 (the same data can be specified), and nothing is specified in the flow information management tables 241 of the wireless base stations 112, 111, and 113. The data of the flow management table 301 on the communication control apparatus 120 is specified as shown in FIG. 8, and nothing is specified in the resource management table 302 of the communication control apparatus 120. Each of the wireless base stations may have just one sector.

The wireless terminal 100 or the maintenance apparatus 150 sends a flow delivery request message to the wireless base station 112, specifying the flow ID of a flow to be delivered (in step 1010). The flow IDs and the flows to be sent to the wireless terminal 100 are associated in a one-to-one relationship, and the association is specified in the wireless terminal 100 or the maintenance apparatus 150 before the flow delivery request message is sent to the wireless base station 112. The flow ID is uniquely identified when the user of the wireless terminal 100 or the operator using the maintenance apparatus 150 selects the flow to be sent.

When the flow delivery request message is received from the wireless terminal 100 or the maintenance apparatus 150, the call processing block 201 of the wireless base station 112 references the SHOG management table 240 and reads the SHOG information specified for each of the local interlaced streams, which is required to send a service request to the communication control apparatus 120 (in step 1240). The call processing block 201 of the wireless base station 112 sends a Service Request message to the communication control apparatus 120 in order to obtain the information of the interlaced flow transmission stream, transmission timing, transmission time, and the wireless data rate for the sector where the wireless terminal 100 is located (in step 1020). The Service Request message incorporates the flow ID and the SHOG information of each of the local interlaced streams obtained in step 1240.

When the Service Request message is received from the wireless base station 112, the call processing block 311 of the communication control apparatus 120 references the flow management table 301 held in the apparatus and searches through the table in accordance with the flow ID and the SHOG information of each of the interlaced streams included in the Service Request message, and reads the corresponding data, that is, the SHOG information indicating the area of the flow ID transmission, the interlaced stream used to send the flow, the flow transmission time in one cycle, and the flow transmission data rate (in step 1030). The resource management table 302 is searched through in accordance with the SHOG information indicating the area of the flow ID transmission, the interlaced stream used to send the flow, and the flow transmission time in one cycle, which are obtained in step 1030, and if the corresponding flow transmission timing is not specified, the requested flow resource is provisionally assigned to a free resource of the corresponding SHOG, and the flow transmission timing is determined, and the information is stored in the resource management table 302. If the corresponding flow transmission timing has already been registered, the transmission timing is read (in step 1031). (The resource is actually saved when the path is established later.) In this example, the resource management table 302 of the communication control apparatus 120 contains nothing in the initial state. Accordingly, the communication control apparatus 120 generates the corresponding entries of the resource management table 302, as shown in FIG. 9, when the Service Request message is received from the wireless base station 112, and updates and manages the table.

The call processing block 311 of the communication control apparatus 120 returns a Service Response message to the wireless base station 112 (in step 1021). The Service Response message contains the flow ID included in the received Service Request message, the information of the interlaced stream of flow delivery, transmission time, and transmission data rate obtained in step 1030, and the flow transmission timing determined in step 1031. If the resource management table 302 managed by the communication control apparatus 120 indicates that the corresponding SHOG wireless resources do not have sufficient free resources, the Service Request message informs the wireless base station 112 that the assignment is not conducted because sufficient free resources are not available.

The call processing block 201 of the wireless base station 112 establishes a path to pass the flow data to or from the communication control apparatus 120 (in step 1040), by using the flow ID and the interlaced stream of flow delivery, transmission time, transmission data rate, and transmission timing received from the communication control apparatus 120. After the path is established, the call processing block 201 of the wireless base station 112 stores the flow ID, interlaced delivery stream, transmission timing, transmission time, transmission data rate, and other resource information, in the flow information management table 241 for the sector where the wireless terminal 100 or the maintenance apparatus 150 is located (in step 1241). The flow information management table 241 of the wireless base station 112 contains nothing in the initial state. When the Service Response message is received from the communication control apparatus 120, the wireless base station 112 generates the corresponding entries of the flow information management table 241, as shown in FIG. 7, and updates and manages the table.

The call processing block 311 of the communication control apparatus 120 establishes the resource information of the flow provisionally assigned in the flow management table 301 in step 1031 (in step 1032). The communication control apparatus 120 sends a flow delivery request to the content server 140 (in step 1060). When the flow delivery request is received from the communication control apparatus 120, the content server 140 starts delivering the content 400 through the communication control apparatus 120 to the wireless base station 112 (in step 1050). The wireless base station 112 sends the flow by radio in the sector (in step 1051), in accordance with the interlaced delivery stream, transmission time, transmission data rate, and transmission timing obtained from the communication control apparatus 120.

If the neighbor wireless base stations 111 and/or 113 receive a flow delivery request having the same flow ID from the same wireless terminal 100 or maintenance apparatus 150 while the flow transmission by the wireless base station 112 is in progress, the sequence becomes as described below.

The wireless terminal 100 or maintenance apparatus 150 sends a flow transmission request to the wireless base stations 111 and/or 113, specifying the flow ID (in step 1011). The call processing blocks 201 of the wireless base station 111 and/or 113 reference the local SHOG management table 240 and read the SHOG specified for each of the interlaced streams (in step 2240). The call processing blocks 201 of the wireless base station 111 and/or 113 send a Service Request message to the communication control apparatus 120 (in step 1022). The Service Request message incorporates the flow ID and the SHOG information specified for the interlaced stream. The call processing block 311 of the communication control apparatus 120 references the flow management table 301 as described earlier and reads the SHOG corresponding to the flow ID, the interlaced stream to be used, the flow transmission time, and the flow transmission data rate (in step 1033). The resource management table 302 is also referenced, and if the transmission timing of the corresponding flow is stored, a wireless resource is provisionally assigned, and the flow transmission timing is read (in step 1034).

When the same flow ID is assigned, the wireless resource assigned before is used. The call processing block 311 of the communication control apparatus 120 returns a Service Response message to the wireless base stations 111 and/or 113 (in step 1023). The Service Response message incorporates the flow ID, the interlaced stream to be used, flow transmission timing, flow transmission time, and flow transmission data rate. The call processing blocks 201 of the wireless base station 111 and/or 113 establish a path (in step 1041) in accordance with the information received from the communication control apparatus 120. The flow resource information is stored in the local flow information management table 241 (in step 2241). The communication control apparatus 120 delivers the flow delivered from the content server 140 to the wireless base stations 111 and/or 113 as well (in step 1052). The wireless base stations 111 and/or 113 send the flow by radio (in step 1053) in accordance with the interlaced delivery stream, transmission time, transmission data rate, and transmission timing, obtained from the communication control apparatus 120. The flow from the wireless base station 112 and the flow from the wireless base stations 111 and/or 113 are sent by the same SHOG wireless resource managed by the communication control apparatus 120, and the wireless terminal 100 can receive and combine (soft-combine) the flows sent from the wireless base stations in steps 1051 and 1053 (in step 1070).

4. Operation 2 (Soft-Combine Between a Sector of a Wireless Base Station and a Sector Neighbor Thereto in the Same Wireless Base Station)

Figure 13:
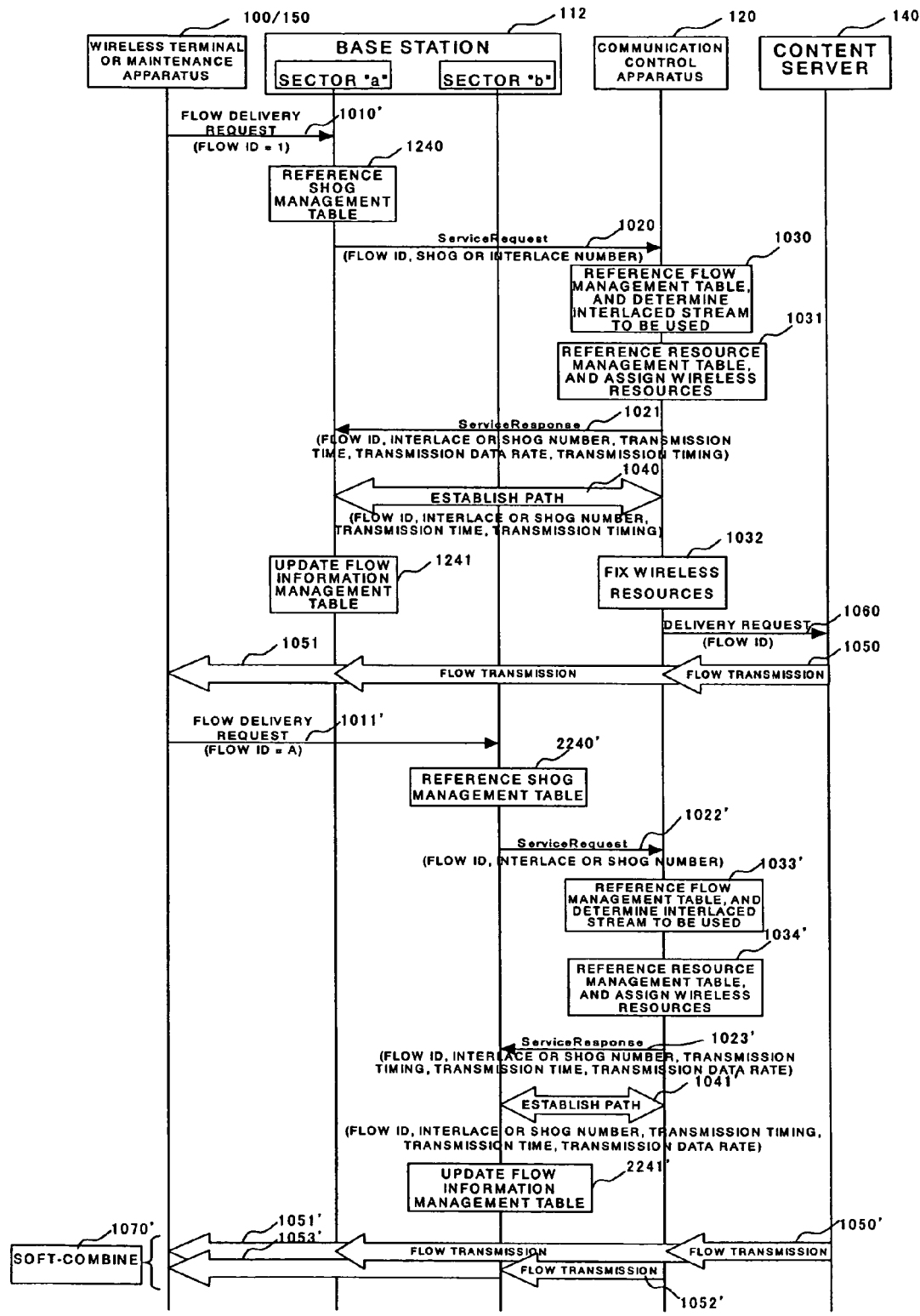
FIG. 13 is a diagram showing a sequence for implementing area management of a second embodiment.

FIG. 13 is a diagram showing a sequence for implementing area management of a second embodiment.

The initial state of the embodiment is as follows. The data of the SHOG management table 240 of the wireless base station 112 is specified in advance as shown in FIG. 6, for instance, and nothing is specified in the flow information management table 241 of the wireless base station 112. The data of the flow management table 301 of the communication control apparatus 120 is specified in advance as shown in FIG. 8, for instance, and nothing is specified in the resource management table 302 of the communication control apparatus 120.

The wireless terminal 100 or the maintenance apparatus 150 sends a flow delivery request message to the wireless base station 112, specifying the flow ID of a flow to be delivered in sector "a" (in step 1010').

Steps 1240 to 1051 are executed in the same way as described in "3. Operation 1." When the flow delivery request is received from the communication control apparatus 120, the content server 140 starts delivering the content 400 through the communication control apparatus 120 to the wireless base station 112 (in step 1050). The wireless base station 112 sends the flow by radio in the sector (in step 1051) in accordance with the interlaced delivery stream, transmission time, transmission data rate, and transmission timing obtained from the communication control apparatus 120.

If a flow delivery request having the same flow ID is received in another sector "b" of the wireless base station 112 while the flow is being sent in sector "a" of the wireless base station 112, the sequence becomes as described below.

The wireless terminal 100 or maintenance apparatus 150 sends a flow transmission request to the wireless base station 112 in sector "b", specifying the flow ID (in step 1011'). The call processing block 201 of the wireless base station 112 references the local SHOG management table 240 and reads the SHOG specified for the interlaced streams (in step 2240'). The call processing block 201 of the wireless base station 112 sends a Service Request message to the communication control apparatus 120 (in step 1022'). The Service Request message incorporates the flow ID and the SHOG information specified for the interlaced streams. The call processing block 311 of the communication control apparatus 120 references the flow management table 301 as described earlier and reads the SHOG corresponding to the flow ID, the interlaced stream to be used, the flow transmission time, and flow transmission data rate (in step 1033'). The resource management table 302 is also referenced, and if the transmission timing of the corresponding flow is stored, a wireless resource is provisionally assigned, and the flow transmission timing is read (in step 1034').

When the same flow ID is assigned, the wireless resource assigned before is used. The call processing block 311 of the communication control apparatus 120 returns a Service Response message to the wireless base station 112 (in step 1023'). The Service Response message incorporates the flow ID, the interlaced stream to be used, flow transmission timing, flow transmission time, and flow transmission data rate. The call processing block 201 of the wireless base station 112 establishes a path for sector "b" in accordance with the information received from the communication control apparatus 120 (in step 1041'). The flow resource information is stored in the local flow information management table 241 (in step 2241'). The communication control apparatus 120 delivers the flow delivered from the content server 140 in sector "b" of the wireless base station 112 as well (in step 1052'). The wireless base station 112 sends the flow in sector "b" by radio (in step 1053') in accordance with the interlaced delivery stream, transmission time, transmission data rate, and transmission timing obtained from the communication control apparatus 120. The flow sent at sector "a" of the wireless base station 112 and the flow sent at sector "b" of the wireless base station 112 are sent by the same SHOG wireless resource managed by the communication control apparatus 120, and the wireless terminal 100 can receive and combine (soft-combine) the flows sent at the sectors of the same wireless base station in steps 1051' and 1053' (in step 1070').

The present invention can be applied to a system including a variety of wireless base stations such as a wireless base station which is not divided into sectors and a wireless base station which is divided into a plurality of sectors.

What is claimed is:

1. An area management system comprising:
a plurality of wireless base stations which have one or more sectors;
a communication control apparatus connected to the plurality of wireless base stations, for controlling flows of a multicast content; and
a wireless apparatus for combining flows transmitted from plural wireless base stations and restoring the content, wherein
each of the plurality of wireless base stations comprises:
an area information management table having stored an area identification number indicating a flow transmission area for each interlace number used in flow transmission; and
a flow information management table having stored an interlace number, a transmission timing for periodically transmitting a flow periodically in an interlaced stream, a flow transmission time in one cycle, and a transmission data rate in flow transmission, for each flow ID obtained from the communication control apparatus;
the communication control apparatus comprises:
a flow management table having stored an area identification number, an interlace number, a transmission time, and a transmission data rate, for each flow ID; and
a resource management table having stored a flow ID, an interlace number, a transmission timing, and a flow transmission time, for each area identification number;
and,
the wireless apparatus sends a first flow delivery request to one of the plurality of wireless base stations, with the flow ID of a content-delivery flow specified;
when the wireless base station receives the first flow delivery request from the wireless apparatus, the wireless base station references the area information management table, reads the area identification number specified for each local interlace number, which is required when a service request is sent to the communication control apparatus, and sends a first request message containing the flow ID specified in the first flow delivery request and the read area identification number of each local interlace number, to the communication control apparatus;

when the communication control apparatus receives the first request message from the wireless base station, the communication control apparatus references the flow management table and reads the corresponding area identification number, interlace number, transmission time, and transmission data rate in accordance with the first request message;

the communication control apparatus references the resource management table in accordance with the flow ID and the read area identification number, interlace number, and transmission time, determines a flow transmission timing by provisionally assigning a requested flow resource to a free resource of the corresponding area identification number and stores the transmission timing in association with the area identification number, the flow ID, the interlace number, and the transmission time in the resource management table if the corresponding flow transmission timing is not specified, or reads the transmission timing from the resource management table if the corresponding flow transmission timing is specified;

the communication control apparatus returns a first response message containing the flow ID included in the received first request message, the interlace number of the interlaced stream to deliver the flow, the transmission time, the transmission data rate, and the transmission timing, to the wireless base station;

when the wireless base station receives the first response message, the wireless base station stores the flow ID and flow information received from the communication control apparatus, containing the interlace number, the transmission time, the transmission data rate, and the transmission timing, in the flow information management table, establishes a path to pass the flow to or from the communication control apparatus, in accordance with the flow information, and sends the flow by radio in accordance with the flow information;

while the wireless base station is sending the flow, if a neighbor wireless base station receives a second flow delivery request having the same flow ID from the same wireless apparatus, the neighbor wireless base station references the local area information management table, reads the area identification number specified for each interlace number, and sends a second request message to the communication control apparatus;

the communication control apparatus references the flow management table, reads the area identification number, the interlace number, the transmission time, and the transmission data rate, corresponding to the flow ID, and returns a second response message containing the same flow information as the first response message to the neighbor wireless base station;

when the neighbor wireless base station receives the second response message from the communication control apparatus, the neighbor wireless base station stores the same flow information as in the first response message in the local flow information management table for a sector where the wireless apparatus is located, establishes a path to pass the flow to or from the communication control apparatus in accordance with the flow information, and sends the flow by radio in the corresponding sector in accordance with the flow information such that the same content is sent from the neighbor wireless base station and the wireless base station substantially at the same timing; and the wireless apparatus receives and combines the flow from the wireless base station and the flow from the neighbor wireless base station.

2. An area management system according to claim 1, wherein, if free wireless resources of the corresponding area identification number of the resource management table managed by the communication control apparatus are not sufficient, the response message reports that the free resources are insufficient and the assignment is impossible.

3. An area management system according to claim 1, further comprising:

a content server connected to the communication control apparatus through a network, for sending a content flow, wherein the communication control apparatus determines the flow resource information provisionally assigned in the flow management table and sends a flow delivery request to the content server; and the content server starts content delivery when the content server receives the flow delivery request from the communication control apparatus.

4. An area management system according to claim 1, wherein each of the plurality of wireless base stations has one or more sectors;

a single sector has a plurality of interlace numbers; and each of the plurality of wireless base stations belongs to a plurality of areas by managing the areas by the interlace numbers.

5. An area management system according to claim 1, wherein the sector resource is divided into a plurality of groups; and each of the plurality of wireless base stations belongs to a plurality of areas by managing the areas in each of the plurality of groups.

6. An area management system according to claim 1, wherein the communication control apparatus, which is on a higher level than the plurality of wireless base stations, manages resources in each area to implement soft-combine in a variety of large and small areas.

7. An area management system according to claim 1, wherein the wireless apparatus is a maintenance apparatus for performing either or both of failure monitoring and control; and the maintenance apparatus sends a flow delivery request and establishes a path.

8. An area management system according to claim 1, wherein the wireless apparatus is a wireless terminal.

9. An area management system according to claim 1, wherein the area identification information is a soft handoff group (SHOG).

10. An area management system comprising:

a wireless base station having a plurality of sectors;

a communication control apparatus connected to the wireless base station, for controlling flows of a multicast content;

and a wireless apparatus for combining flows sent at plural sectors of the wireless base station and restoring the content, wherein the wireless base station comprises:

an area information management table having stored an area identification number indicating a flow transmission area for each interlace number used in flow transmission, in association with each sector; and a flow information management table having stored an interlace number, a transmission timing for transmitting a flow periodically in an interlaced stream, a flow transmission time in one cycle, and a transmission data rate in flow transmission, for each flow ID obtained from the communication control apparatus, in association with each sector;

the communication control apparatus comprises:

a flow management table having stored an area identification number, an interlace number, a transmission time, and a transmission data rate, for each flow ID; and a resource management table having stored a flow ID, an interlace number, a transmission timing, and a flow transmission time, for each area identification number;

and, the wireless apparatus sends a first flow delivery request to the wireless base station, with a flow ID of a content-delivery flow in a first sector specified;

when the wireless base station receives the first flow delivery request from the wireless apparatus, the wireless base station references the area information management table for a sector where the wireless apparatus is located, reads the area identification number specified for each local interface number, which is required when a service request is sent to the communication control apparatus, and sends a first request message containing the flow ID specified in the first flow delivery request and the read area identification number for each local interlace number, to the communication control apparatus;

when the communication control apparatus receives the first request message from the wireless base station, the communication control apparatus references the flow management table and reads the corresponding area identification number, interlace number, transmission time, and transmission data rate, in accordance with the first request message;

the communication control apparatus references the resource management table in accordance with the flow ID and the read area identification number, interlace number, and transmission time, determines a flow transmission timing by provisionally assigning a requested flow resource to a free resource of the corresponding area identification number and stores the transmission timing in association with the area identification number, the flow ID, the interlace number, and the transmission time in the resource management table if the corresponding flow transmission timing is not specified, or reads the transmission timing from the resource management table if the corresponding flow transmission timing is specified;

the communication control apparatus returns a first response message containing the flow ID included in the received first request message, the interlace number of the interlaced stream to deliver the flow, the transmission time, the transmission data rate, and the transmission timing, to the wireless base station;

when the wireless base station receives the first response message, the wireless base station stores the flow ID and flow information received from the communication control apparatus, containing the interlace number, the transmission time, the transmission data rate, and the transmission timing, in the flow information management table, in association with a sector where the wireless apparatus is located, establishes a path to pass the flow to or from the communication control apparatus, in accordance with the flow information, and sends the flow by radio in the sector in accordance with the flow information;

while the wireless base station is sending the flow in the first sector, when a second flow delivery request having the same flow ID is received from the same wireless apparatus in a second sector of the wireless base station, the wireless base station references the area information management table, reads the area identification number specified for each interlace number for the second sector, and sends a second request message to the communication control apparatus;

the communication control apparatus references the flow management table, reads the area identification number, the interlace number, the transmission time, and the transmission data rate, associated with to the corresponding flow ID, and returns a second response message containing the same flow information as the first response message to the second sector of the wireless base station;

when the wireless base station receives the second response message from the communication control apparatus, the wireless base station stores the same flow information as in the first response message in the flow information management table for the second sector, establishes a path to pass the flow to or from the communication control apparatus in accordance with the flow information, and sends the flow by radio in the second sector in accordance with the flow information such that the same content is sent at the first sector of the wireless base station and the second sector of the wireless base station substantially at the same timing; and the wireless apparatus receives and combines the flow at the first sector of the wireless base station and the flow at the second sector of the wireless base station.

11. An area management system according to claim 10, wherein, if free wireless resources of the corresponding area identification number of the resource management table managed by the communication control apparatus are not sufficient, the response message reports that the free resources are insufficient and the assignment is impossible.

12. An area management system according to claim 10, further comprising:
a content server connected to the communication control apparatus through a network, for sending a content flow,
wherein the communication control apparatus determines the flow resource information provisionally assigned in the flow management table and sends a flow delivery request to the content server; and
the content server starts content delivery when the content server receives the flow delivery request from the communication control apparatus.

13. An area management system according to claim 10,
wherein each of the plurality of wireless base stations has one or more sectors;
a single sector has a plurality of interlace numbers; and
each of the plurality of wireless base stations belongs to a plurality of areas by managing the areas by the interlace numbers.

14. An area management system according to claim 10,
wherein the sector resource is divided into a plurality of groups; and
each of the plurality of wireless base stations belongs to a plurality of areas by managing the areas in each of the plurality of groups.

15. An area management system according to claim 10, wherein the communication control apparatus, which is on a higher level than the plurality of wireless base stations, manages resources in each area to implement soft-combine in a variety of large and small areas.

16. An area management system according to claim 10,
wherein the wireless apparatus is a maintenance apparatus for performing either or both of failure monitoring and control; and
the maintenance apparatus sends a flow delivery request and establishes a path.

17. An area management system according to claim 10, wherein the wireless apparatus is a wireless terminal.

18. An area management system according to claim 10, wherein the area identification information is a soft handoff group (SHOG).

* * * * *